(12) United States Patent
Allan et al.

(10) Patent No.: US 8,619,785 B2
(45) Date of Patent: Dec. 31, 2013

(54) PRE-COMPUTING ALTERNATE FORWARDING STATE IN A ROUTED ETHERNET MESH NETWORK

(75) Inventors: David Allan, Ottawa (CA); Peter Ashwood Smith, Hull (CA)

(73) Assignee: Ciena Corporation, Hanover, MD (US)

( * ) Notice: Subject to any disclaimer, the term of this patent is extended or adjusted under 35 U.S.C. 154(b) by 257 days.

(21) Appl. No.: 12/431,493

(22) Filed: Apr. 28, 2009

(65) Prior Publication Data

US 2010/0271936 A1  Oct. 28, 2010

(51) Int. Cl.
*H04L 12/28* (2006.01)
*H04L 12/26* (2006.01)
*H04L 12/56* (2006.01)

(52) U.S. Cl.
USPC ...... 370/395.32; 370/218; 370/225; 370/256; 370/408

(58) Field of Classification Search
None
See application file for complete search history.

(56) References Cited

U.S. PATENT DOCUMENTS

| | | | |
|---|---|---|---|
| 6,430,150 B1 * | 8/2002 | Azuma et al. | 370/218 |
| 7,359,377 B1 * | 4/2008 | Kompella et al. | 370/389 |
| 7,539,907 B1 * | 5/2009 | Johnsen et al. | 714/47.2 |
| 7,859,993 B1 * | 12/2010 | Choudhury et al. | 370/217 |
| 7,864,751 B2 * | 1/2011 | Greenberg | 370/351 |
| 7,924,836 B2 | 4/2011 | Chiabaut et al. | |
| 8,005,016 B2 | 8/2011 | Chiabaut et al. | |
| 2008/0144644 A1 * | 6/2008 | Allan et al. | 370/401 |

* cited by examiner

*Primary Examiner* — Ayaz Sheikh
*Assistant Examiner* — Sori Aga
(74) *Attorney, Agent, or Firm* — Muncy, Geissler, Olds & Lowe, PLLC

(57) ABSTRACT

A set of critical nodes or links is identified on the network and alternate forwarding state is pre-computed and disseminated within a node such that, upon failure of one of the critical nodes/links, a minimal trigger will cause the alternate forwarding state to be used to forward traffic on the routed Ethernet mesh network. In one embodiment rather than storing full tables of alternate forwarding state, only the changes to the forwarding state required by an identified failure is stored by the network nodes. Upon occurrence of a failure on the network, the identified failure is used to select the alternate forwarding state.

20 Claims, 2 Drawing Sheets

PRE-COMPUTING ALTERNATE FORWARDING STATE IN A ROUTED ETHERNET MESH NETWORK

TECHNICAL FIELD

The present invention relates to communication networks, and, more particularly, to a method and apparatus for pre-computing alternate forwarding state in a routed Ethernet mesh network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements. Ethernet is one such well known networking protocol that has been defined by the Institute of Electrical and Electronics Engineers (IEEE) as standards 802.1 and 802.3.

A routing protocol such as Intermediate System to Intermediate System (IS-IS) may be run on an Ethernet network as described in application Ser. No. 11/537,775, filed Oct. 2, 2006, entitled "Provider Link State Bridging," the content of which is hereby incorporated herein by reference. In a link state protocol controlled Ethernet network, rather than utilizing a learned network view at each node by using the Spanning Tree Protocol (STP) algorithm combined with transparent bridging, the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute shortest path connectivity between any pair of bridges in the network, and individually can populate their filtering databases (FDBs) according to the computed view of the network. When all nodes have computed their role in the synchronized view and populated their FDBs for a given topology, the network will have a loop-free unicast tree to any given bridge from the set of peer bridges; and a both congruent and loop-free point-to-multipoint (p2mp) multicast tree from any given bridge to the same set of peer bridges.

When a failure occurs on a routed Ethernet mesh network, the failure will be signaled on the network to all of the nodes. This will cause the nodes to update their network topology database, calculate new shortest path trees on the network, compute new forwarding state based on the new shortest paths, and download and install new forwarding state into their Filtering Databases (FDBs) based on the new network topology. The nodes may also need to synchronize with each other prior to activation of the forwarding state to ensure that transient loops do not occur. This may be a relatively slow process and, accordingly, it would be advantageous to provide a method for accelerating this process.

SUMMARY

A set of critical nodes or links is identified on the network and alternate forwarding state is pre-computed and disseminated within a node such that, upon failure of one of the critical nodes/links, a minimal trigger will cause the alternate forwarding state to be used to forward traffic on the routed Ethernet mesh network. In one embodiment rather than storing full tables of alternate forwarding state, only the changes to the forwarding state required by an identified failure is stored by the network nodes. Upon occurrence of a failure on the network, the identified failure is used to select the alternate forwarding state.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
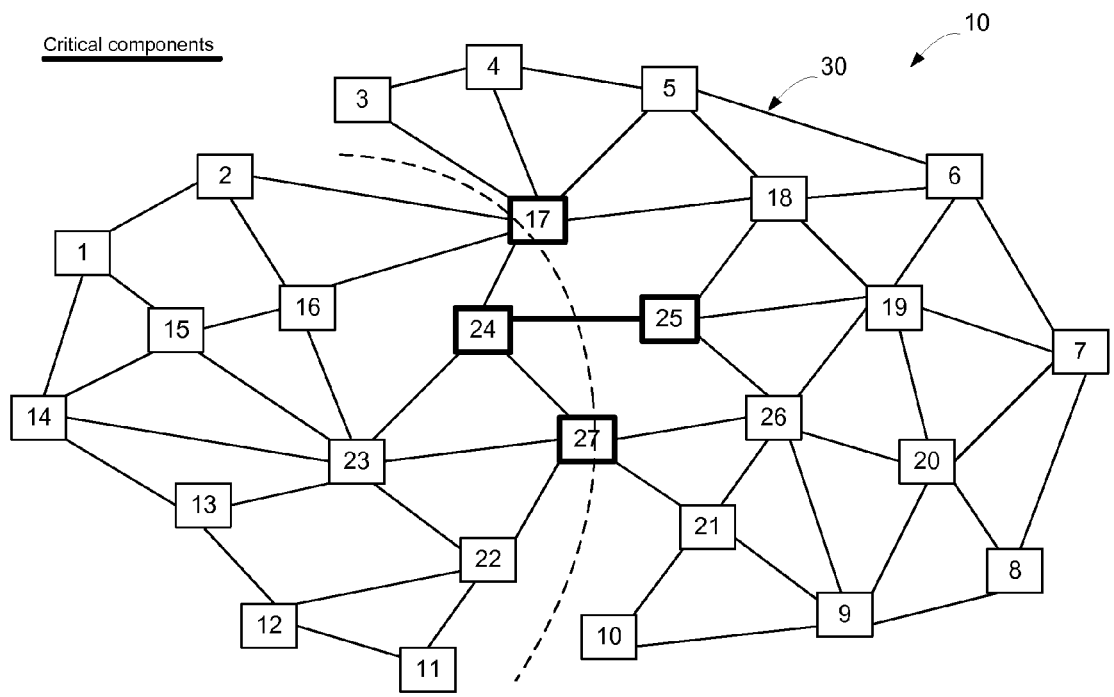
FIG. 1 is a functional block diagrams of a reference communication network showing an example selection of critical components.

FIG. 1 shows a reference routed Ethernet mesh network including a plurality of nodes numbered 1-25 interconnected by links 30. In FIG. 1, several of the nodes and links have been deemed to be critical components (highlighted using dark lines). In particular, nodes 17, 24, 25, and 27, and the link interconnecting nodes 24 and 25, have been deemed to be critical components since failure of one of these nodes/links is likely to affect a relatively large number of shortest path calculations on the network.

There are many ways of determining critical components on the network and the invention is not limited to of the several methods of selecting critical components described in connection with the several embodiments. For example, where shortest path forwarding is being used on the routed Ethernet mesh network, the nodes on the network with the largest number of shortest paths passing through them may be selected as critical components. Selection of this set of components may be advantageous in that failure of one of these components is likely to have a relatively large impact on traffic patterns on the network.

For example, in FIG. 1, the network has been designed such that it has two areas which are interconnected by three components—nodes 17 and 27, and the link between nodes 24 and 25. The two logical halves of the network are shown divided by a dashed line. If any of the components interconnecting these two halves of the network fails, all of the unicast and multicast paths that traverse these components will need to be shifted. Accordingly, failure of one of these components may be expected to have a greater impact on the network traffic patterns than failure of a node such as node 3 or node 10 which is unlikely to be included in a large number of unicast/multicast paths.

In another embodiment, nodes and links on the network are ranked according to selected criteria, such as the number of paths reliant on that particular component. Rather than select a particular number of these components as critical, the nodes on the network may rank the set of possible outages and process the nodes/links in ranked order until memory resources at the node have been sufficiently consumed. For example, each node may allocate a particular amount of memory for storage of pre-computed alternate state, and may process the ranked nodes/links to compute alternate forwarding state under an assumed failure conditions until the allocated memory has been filled. In this embodiment, a set list of critical components is not processed but rather the number of critical components that may be processed depends on the particular capabilities of the node that is implementing the pre-computing process.

In another embodiment, a network administrator may determine which nodes and links are to be considered to be critical components and may advertise the critical components using link state advertisement. For example, a network operator may have a history of operation of the network and know, from previous experience, which nodes/links tend to fail most frequently. In this instance, the network operator may define the nodes/links that have a tendency to fail as the set of critical components, so that the other nodes on the network may pre-compute alternate forwarding state to be used upon occurrence of a failure of one of these components.

While under normal circumstances the greatest overall benefit will occur if the selection and ranking criteria is common to all nodes, there are circumstances where this is not true. In one embodiment, each node may consider the immediate constellation of nodes and links surrounding it in the context of computational complexity to identify specific failures where it can identify that its computational convergence will be significantly slower than that of its neighbors and prioritize accordingly. One way of implementing a process of this nature is described in U.S. patent Ser. No. 12/259,650, filed Oct. 28, 2008, entitled "Provider Link State Bridging (PLSB) Computation Method" the content of which is hereby incorporated herein by reference. In this embodiment, the nodes may determine whether pre-computation of alternate forwarding state for particular links would radically diminish the number of end points to be considered. In this embodiment, each node would pre-compute alternate forwarding state to be used upon occurrence of a failure of specific neighboring nodes/links independently of the broader network.

Figure 2:
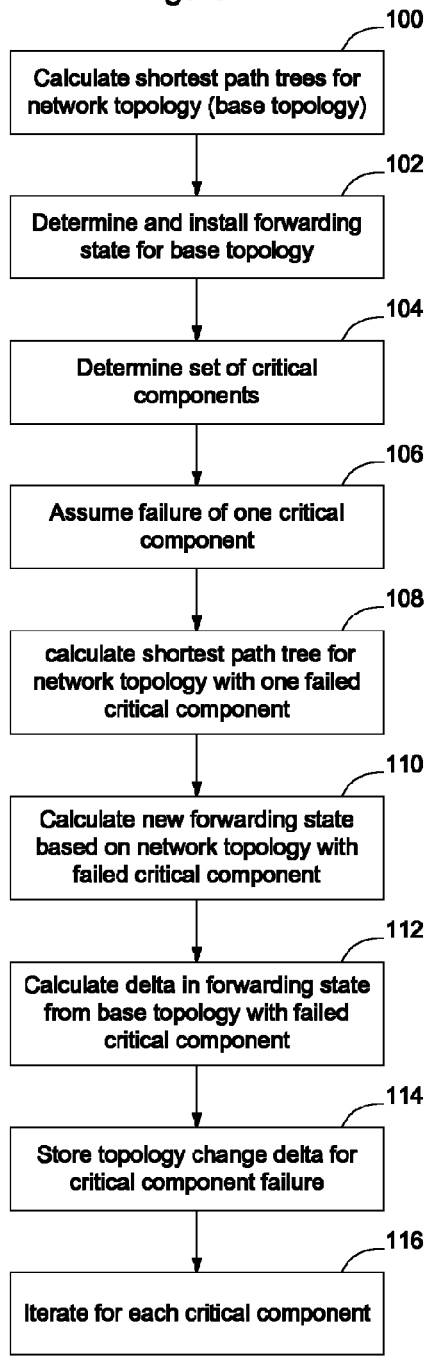
FIG. 2 is a flow diagram of a method of pre-computing alternate forwarding state according to an embodiment of the invention.
Figure 3:
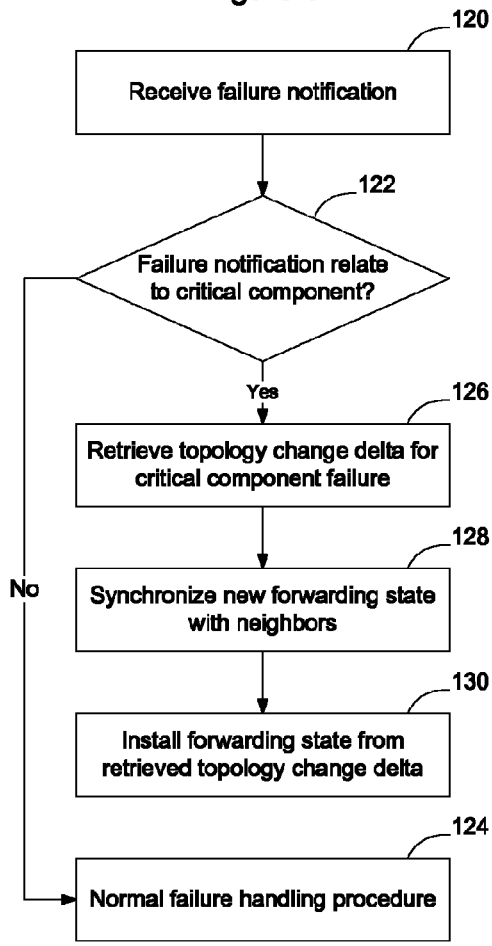
FIG. 3 is a flow diagram of a method of using pre-computed alternate forwarding state according to an embodiment of the invention.

FIGS. 2-3 show a flow chart of a process that may be used to pre-calculate forwarding state in a routed Ethernet mesh network. As shown in FIG. 2, initially all nodes on the network will calculate shortest path trees on the original network topology (100) and determine and install forwarding state for the base topology (102). The original network topology will be referred to herein as the base topology. Calculating shortest path trees and determining and installing forwarding state for the shortest path trees is well known in the art and, accordingly, additional details of this process will not be provided herein.

The nodes on the network will also determine a set of critical components (104) on the network. As noted above, each node may determine its own set of critical components that is unique to that node. Alternatively, each node may calculate a synchronized set of critical components from a set of criteria and its synchronized view of the network topology. Still alternatively, a network administrator may determine a set of critical components and may transmit the set of critical components to the nodes e.g. via a link state advertisement.

Regardless of the manner in which the set of critical components is determined, the nodes will each implement a process of determining alternate forwarding state to be used upon occurrence of a failure of one of the critical components. In one embodiment, the nodes will each assume failure of one of the critical components (106) and calculate a set of shortest paths through the network based on the network topology with the one failed critical component (108). The node will then calculate forwarding state based on the new set of shortest paths (110).

Rather than storing a complete set shortest path trees and forwarding state for the assumed network topology with the one failed critical component, in one embodiment the nodes on the network calculate the difference between the original forwarding state based on the base topology and the new forwarding state based on the assumed network topology with one failed critical component (112). The differences (delta) between the two topologies will then be stored (114) so that the new forwarding state may be used in the event of a failure of that critical component. The nodes will iterate for each identified critical component (116) to create multiple sets of pre-computed alternate forwarding state to be used in the event of a failure of any one of the critical components.

As described in greater detail below, a loop avoidance process may require synchronization between neighboring nodes before installation of multicast forwarding state. In this context, accordingly, two sets of forwarding state changes (deltas) may be calculated for a given failure scenario. The first delta is the immediate forwarding state changes to apply prior to initiating neighbor synchronization, the second is the changes to apply once neighbor synchronization has been achieved. The forwarding state changes may be grouped in other ways as well.

Storing the differences in forwarding state between what is currently in use given the current network topology (base topology) and the assumed network topology with a failed critical component reduces the amount of forwarding state that must be stored for each assumed failure. However, since the differences relate to the current network topology, if the current network topology changes (i.e. there is a failure of a non-critical component) the pre-computation of the alternate forwarding state will need to be repeated for each critical component. In one embodiment pre-calculation of the alternate forwarding state may commence and run as a background process on the nodes after the network has synchronized after failure of the non-critical component. If failure of a critical component occurs before alternate forwarding state has been pre-computed for that assumed failure, the failure of the critical component will be processed in a normal manner.

FIG. 3 shows a process that may be used to implement the pre-calculated state upon receipt of a failure notification (120). Specifically, upon receipt of a failure notification, the node will determine whether the failure notification relates to a critical component (122). If not, normal failure handling procedures may be used by the node to calculate new forwarding state based on the new network topology (124).

If the failure notification relates to one of the critical components, in one embodiment the node will have pre-stored the topology change deltas in the line cards and may simply send an instruction to the line cards to use the alternate forwarding state for the detected critical component failure that was pre-calculated. By pre-programming the deltas into the line cards, the node may skip the calculation process as well as the process of installing the forwarding state into the line cards.

In another embodiment, the node may pre-calculate the forwarding state and store the pre-calculated forwarding state, but not install the alternate forwarding state into the line cards. In this embodiment, if the failure notification relates to one of the critical components, the node will retrieve the topology change delta for the critical component failure that was calculated at box 112 and stored at box 114 of the process described in connection with FIG. 2. By simply retrieving the forwarding state that is to be used in the event of a critical component failure, the nodes may, in effect, pre-process the state to be used to enable this portion of the failure recovery process to be accelerated. The selected alternative forwarding state may then be loaded into the line cards to be used in connection with forwarding data on the network.

Loop avoidance is very important in a multicast context and, according to an embodiment of the invention, the nodes implement a loop avoidance function to prevent the formation of loops in connection with installation of new forwarding state. Specifically, in this embodiment, the nodes need to remove multicast forwarding state that is "at risk" and synchronize both forwarding and topology database state with their neighbors (128) prior to installing new multicast forwarding state. This process will be implemented regardless of whether the node has pre-installed the forwarding state into the line cards or whether the pre-calculated forwarding state is only installed into the line cards after occurrence of the failure.

In one embodiment, the loop avoidance process documented in U.S. patent application Ser. No. 12/260,558 filed Oct. 29, 2008 may be used to implement loop avoidance. The content of this application is hereby incorporated herein by reference. As documented in this application, when calculating a multicast tree, a node that has determined that its distance to the root of a tree has changed will remove all multicast entries in the downstream direction, and for every leaf for which the distance has changed will remove the multicast entries associated with the leaf. It will then use a handshake procedure to synchronize with its neighbor closer to the root to make sure that that neighbor has also calculated that it is closer to the root before installing new state for the multicast trees in that VID. Likewise, the node will synchronize with its neighbors farther from the root to make sure those neighbors believe that they are farther away from the root before installing state on those respective interfaces. Implementing a handshake process of this nature enables the nodes to confirm their relative location in a tree structure to ensure that the nodes have a synchronized view of the network in a given algorithm prior to installing forwarding state for the multicast trees. The handshake may be used regardless of the algorithm used to calculate the tree, as it implements an exchange of a digest of the information common to the computation used by all tree calculation algorithms. In the context of this invention this translates into two sets of deltas to be applied for a given failure scenario. The first delta is the immediate forwarding state changes to apply prior to neighbor synchronization, the second is the changes to apply once neighbor synchronization has been achieved.

Once the nodes have synchronized with their neighbors to ensure that loops will not be created by installation of the new forwarding state, the nodes will install the new forwarding state from the retrieved topology change delta (130).

Figure 4:
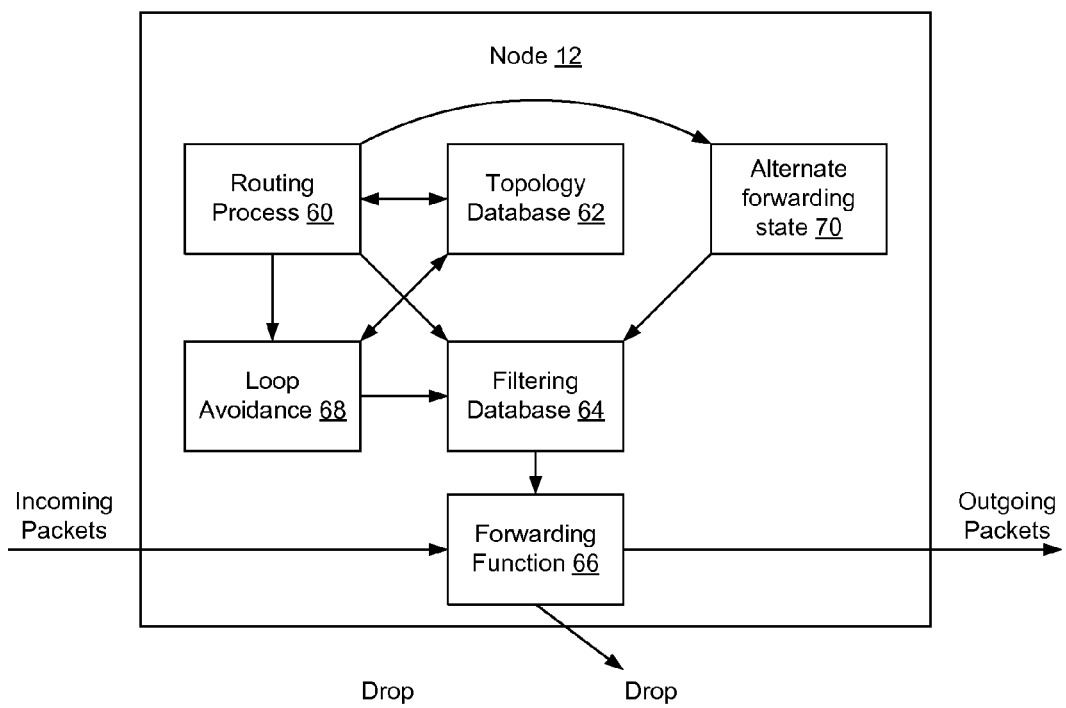
FIG. 4 is a functional block diagram of an example node that may be used to pre-compute alternate forwarding state in a routed Ethernet mesh network according to an embodiment of the invention.

FIG. 4 shows an example node 12 that may be used to implement an embodiment of the invention. As shown in FIG. 4, the node includes a routing process 60 that exchanges link state protocol messages with other nodes on the network to build a network topology database 62. The routing process 60 uses the topology maintained in the topology database to calculate shortest path trees through the network and calculate forwarding state to be used by the node to forward data on the network. The node will selectively install forwarding state to implement the shortest path trees in its filtering database 64 which may be used by a forwarding function 66 to selectively forward packets on the multicast tree.

As noted above, loop prevention is very important in a multicast context and, according to an embodiment of the invention, the node 12 includes a loop avoidance function 68 to implement the loop avoidance process discussed herein.

As noted above, the node 12 pre-calculates alternate forwarding state based on pre-assumed failure scenarios associated with critical components of the routed Ethernet mesh network. In the embodiment shown in FIG. 4, the node 12 stores the differences (deltas) in an alternate topology database 70 so that the new forwarding state may be used in the event of a failure of a critical component on the network. The deltas may be loaded into the line cards prior to occurrence of a failure (i.e. installed into Filtering Database) as an alternate set of forwarding state, or may be loaded into the FDB after occurrence of the failure.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of pre-computing an alternate forwarding state in a routed Ethernet mesh network, the method comprising:

calculating, by a node, a forwarding state for the routed Ethernet mesh network based on a current topology of the routed Ethernet mesh network;

pre-computing, by the node, the alternate forwarding state for the routed Ethernet mesh network assuming failure of a first critical component of the routed Ethernet mesh network; and pre-computing and storing, by the node, only differences between the forwarding state and the alternate forwarding state.

2. The method of claim 1, further comprising disseminating the differences to all required subsystems in a node in advance of any failure.

3. The method of claim 2, further comprising performing failure recovery with reduced intra nodal synchronization to invoke an appropriate sequence of state modifications to recover from the failure while incorporating loop avoidance.

4. The method of claim 1, further comprising identifying a set of critical components on the routed Ethernet mesh network, the set of critical components including a first critical component.

5. The method of claim 4, further comprising iterating the pre-computing the alternate forwarding state for the routed Ethernet mesh network assuming individual failure of each of the critical components of the set of critical components.

6. The method of claim 4, wherein the critical components of the set of critical components are selected on a network-wide basis.

7. The method of claim 6, wherein the critical components of the set of critical components are selected by nodes on the routed Ethernet mesh network based on a set of criteria and a synchronized view of the current network topology.

8. The method of claim 6, wherein the critical components of the set of critical components are selected via a management system on the routed Ethernet mesh network.

9. The method of claim 8, wherein the critical components of the set of critical components are communicated to nodes on the routed Ethernet mesh network in a link state advertisement.

10. The method of claim 8, wherein the critical components of the set of critical components are selected via the management system based on a failure history or nodes and links on the routed Ethernet network.

11. The method of claim 4, wherein the critical components of the set of critical components are selected individually by each node on the routed Ethernet mesh network to be unique to that node on the routed Ethernet mesh network.

12. A non-transitory computer program product stored on a computer-readable memory, the computer program product including data and instructions which, when loaded on a computer processor, enables one or more processors to implement a method of pre-computing an alternate forwarding state to be used by a node in a routed Ethernet mesh network upon failure of a critical component of the routed Ethernet mesh network, the critical component being selected from a set of critical components on the routed Ethernet mesh network, the method comprising:
  calculating a forwarding state for the routed Ethernet mesh network based on a current topology of the routed Ethernet mesh network;
  pre-computing the alternate forwarding state for the routed Ethernet mesh network assuming failure of a first critical component of the routed Ethernet mesh network; and
  pre-computing and storing only differences between the forwarding state and the alternate forwarding state.

13. The computer program product of claim 12, the method further comprising iterating the pre-computing the alternate forwarding state for the routed Ethernet mesh network assuming individual failure of each of the critical components of the set or critical components.

14. The computer program product of claim 12, wherein the critical components of the set of critical components are selected on a network-wide basis.

15. The computer program product of claim 14, wherein the critical components of the set of critical components are selected by nodes on the routed Ethernet mesh network based on a set of criteria and a synchronized view of the current network topology.

16. The computer program product of claim 14, wherein the critical components of the set or critical components are selected via a management system on the routed Ethernet mesh network.

17. The computer program product of claim 16, wherein the critical components of the set of critical components are communicated to nodes on the routed Ethernet mesh network in a link state advertisement.

18. The method of claim 1, further comprising:
  pre-computing a plurality of alternate forwarding states, each alternate forwarding state corresponding to failure of a different critical component; and
  pre-computing and storing differences between the forwarding state and each of the plurality of alternate forwarding states.

19. The method of claim 1, wherein a critical component is a node with a largest number of shortest paths passing through the node.

20. A method of pre-computing an alternate forwarding state in a routed Ethernet mesh network, the method comprising:
  establishing, by a node, a set of critical components in the routed Ethernet mesh network;
  calculating, by the node, a forwarding state for the routed Ethernet mesh network based on a current topology of the routed Ethernet mesh network;
  pre-computing, by the node, the alternate forwarding state for the routed Ethernet mesh network assuming failure of a critical component from the set of critical components in the routed Ethernet mesh network; and
  pre-computing and storing only differences between the forwarding state and the alternate forwarding state.

* * * * *